May 8, 1962  C. CARROLL  3,033,398
MATERIAL HANDLING DOLLY
Filed Sept. 5, 1957  2 Sheets-Sheet 1
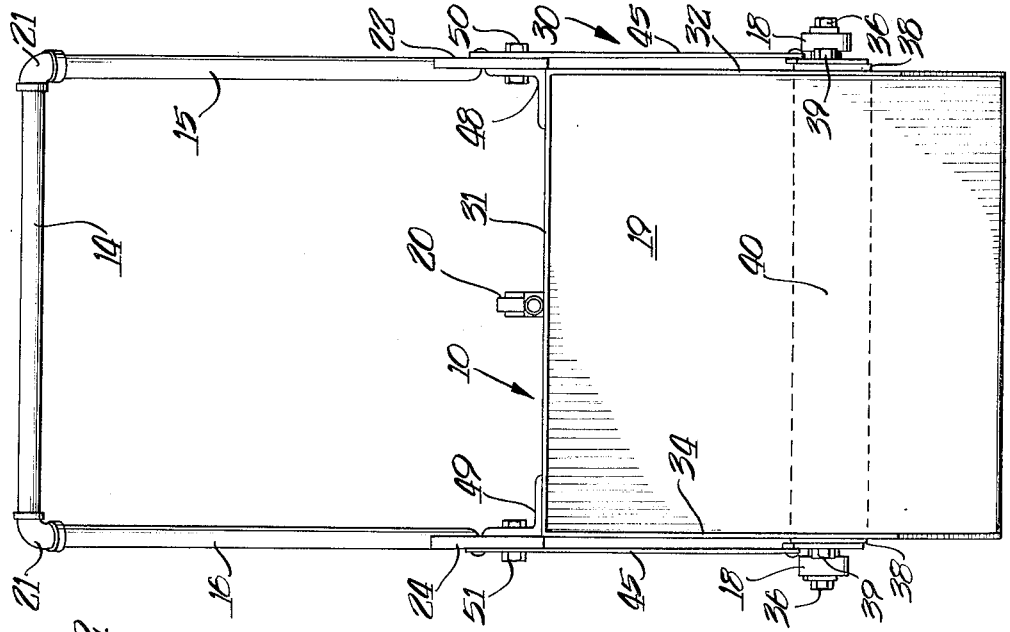
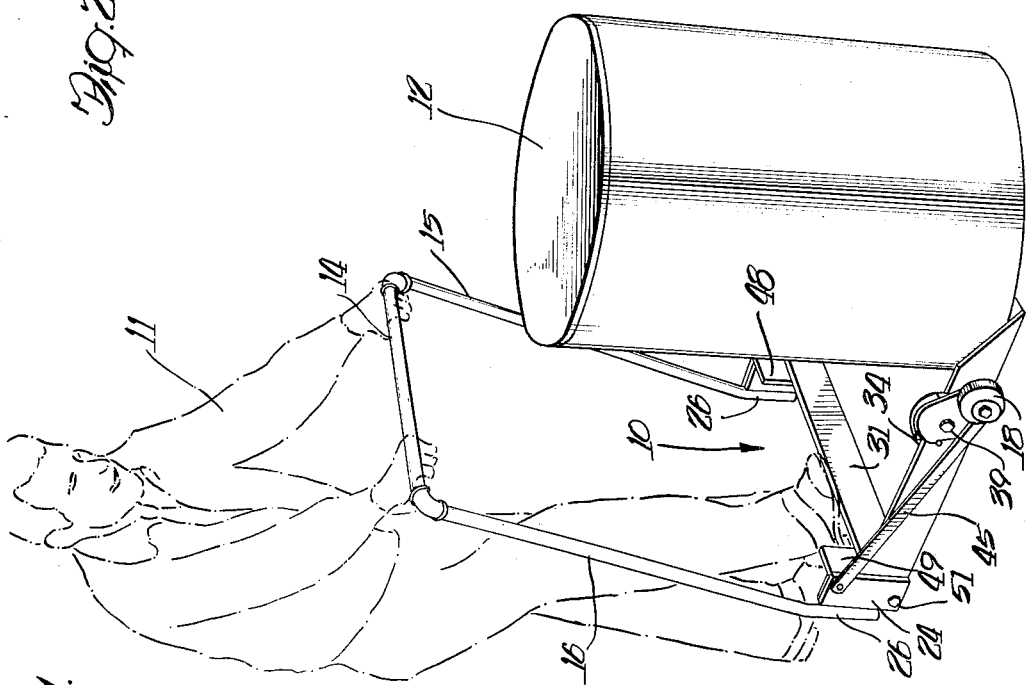
Inventor
Charles Carroll
Jack Dominik
Attorney May 8, 1962 — C. CARROLL — 3,033,398
MATERIAL HANDLING DOLLY Filed Sept. 5, 1957 — 2 Sheets-Sheet 2

Inventor
Charles Carroll
Jack E. Dominik
Attorney

United States Patent Office 3,033,398
Patented May 8, 1962

3,033,398
MATERIAL HANDLING DOLLY
Charles Carroll, Danville, Ill., assignor to Duff-Norton Company, Pittsburgh, Pa.
Filed Sept. 5, 1957, Ser. No. 682,220
7 Claims. (Cl. 214—506)

The present invention relates to a material handling dolly; and more particularly to a dolly which is normally manually operated and through the use of retractable wheels inserted beneath the load.

Although many detailed objectives are achieved through the invention, in the broadest aspect the invention has as its object providing a dolly which is light, sturdy, maneuverable, the bed of which is adjustable to floor level to assist in engaging the load. The foregoing becomes more important when projected into a field of conveyors, pallets, and forked lift trucks for large loads; and manual handling for small loads. Accordingly, a further object of the invention is to furnish a dolly which may be manually operated to bridge the gap between power handling equipment and manual labor.

Naturally, to achieve the usage intended for the dolly, it must be inexpensive to construct and yet durable. As the specification proceeds, it will become apparent that the invention provides a dolly for handling loads of 500 pounds which is of simple construction and can utilize light-weight material for a light end product.

In addition, the invention seeks to provide a dolly which can be manually operated in confined areas due to its great degree of maneuverability and compact construction. In addition, the safety of a load lock for a wheel retraction mechanism is provided.

Further objects and advantages of the materials handling dolly will become apparent as the following description of one physical embodiment of the invention proceeds, taken in conjunction with the accompanying illustrative drawings in which:

FIGURE 1 is a perspective view of an illustrative dolly showing its use in engaging for moving a cylindrical drum.

FIG. 2 is a top view of the dolly shown in FIG. 1, with the handle in the rearward position and the wheels in the transport position.

Figure 3:
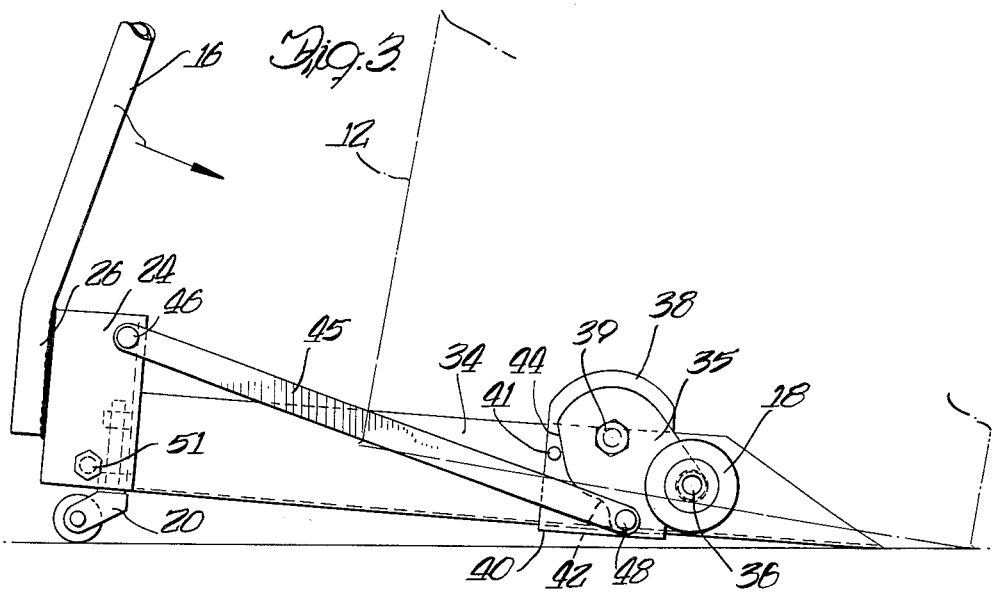
FIG. 3 is an enlarged side-view, showing the handle in the forward position and the main wheels in the retracted position, illustrating how the load is initially engaged.

Referring now to FIG. 1, it will be seen that the dolly 10 is manually operated by an operator 11 who, by the combined use of his feet and hands, can engage a large load 12. The details of construction of the dolly 10 will be more fully appreciated after a brief description of its use in operation. The operator grasps the transverse handle bar 14, throwing the handle legs 15, 16 into the forward position. This action causes the main wheels 18 to retract to the level of the dolly bed 19. Since the forward end of the bed 19 is open, the dolly is then shoved forward by the operator's foot beneath the load 12 which has been tilted. After the bed 19 of the dolly 10 has penetrated sufficiently beneath the center of gravity of the load 12, the handle 14 is moved toward the operator, which lowers the wheels 18 into the ground-engaging or transport position.

Referring now to FIG. 2, it will be seen that the handle 14 and legs 15, 16 may be assembled from simple pipes joined at their intersections by elbows 21. The handle legs 15, 16 are secured at their lower ends to handle pivot blocks 22, 24. In the present instance, as illustrated in FIG. 1, the handle legs 15, 16 have bent lower portions 25, 26 at the junction with the handle pivot back.

The dolly working area or frame portion 30, includes the bed 19 as well as a rear rail 31 and side rails 32, 34. The bed and rails may be formed from a single sheet stock and joined as by welding, at their rear portions. It will be noted that the forward ends of the side rails 32, 34 have been tapered down to the level of the bed 19 so that the frame and bed operate somewhat like a shovel.

The unique retraction and extension of the main wheels 18 to and from the transport and load-engaging positions, is achieved through a toggle-type mounting of the main wheels 18 and an interconnection between that mounting and the handle assembly. Referring now to FIG. 3, it will be seen that a toggle plate 35 has a main wheel 18 rotatably secured to a lower portion of the toggle plate. The axle for the main wheel 18 is shown as a bolt 36, which may be secured to the toggle plate 35 by welding or other convenient fastening means. At its upper portion, the toggle plate 35 is pivotally secured to the sling end 38 by means of a bolt or stud 39. The sling end 38 is in reality one of a pair of ends of the load sling 40 which extends transversely beneath the bed 19 from one side of the frame to the other. A stop 41 is secured to the sling end 38 and oriented to engage the toggle transport detent 42 and also the retraction flat 44 of the toggle plate 35.

Figure 4:
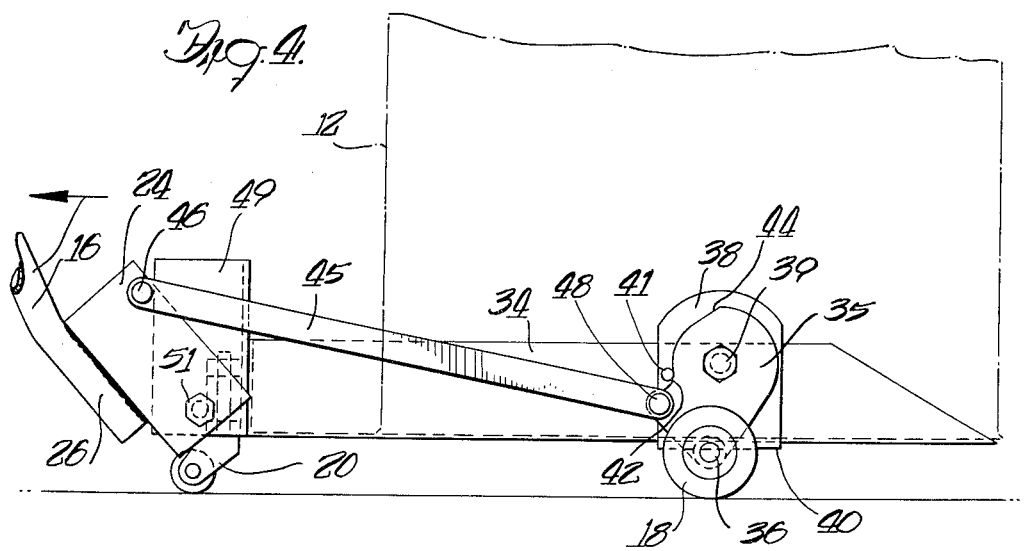
FIG. 4 is taken from the same elevation as FIG. 3, but illustrates the main wheels and handle in the transport position.

Upon the manual movement of the handle assembly forward or rearward, the toggle link 45 pivots the toggle plate 35 about the axis defined by its mounting bolt 39. As will be seen in FIGS. 3 and 4, the toggle link 45 is secured by pivots 46, 48 at its ends, to the handle pivot block 24 and the toggle plate 35, respectively.

As pointed out above, the travel of the toggle plate 35 is limited in the transport and retraction positions by the stop 41. In addition, the pivot block supports 48, 49 are engaged by the lower portions 25, 26 of the handle legs in the retracted or load-engaging position. The pivot block supports 48, 49 are secured to the rear rail 31 by welding or other accepted attaching techniques, and are pivotally connected to the handle pivot locks 22, 24 by means of the handle pivot bolts 50, 51.

Although the rear wheel support has been shown as a caster assembly 20, it will be appreciated that a pair of casters could be employed at the rear for rolling support, or other available rolling members could be employed within the spirit of the invention. For light units and maximum economy in manufacture, the three-wheeled support construction as shown, is most desirable. In the event the principle of the invention is to be employed in larger units with greater capacity, additional wheels as well as additional reinforcement in the frame and bed construction may be required.

Although particular embodiments of the invention have been shown and described in full here, there is no intention to thereby limit the invention to the details of such embodiments. On the contrary, the intention is to cover all modifications, alternative embodiments, usages and equivalents of the material handling dolly as fall within the spirit and scope of the invention, specification, and appended claims.

I claim as my invention:
1. A material handling dolly characterized by a frame, a load-supporting bed secured to the frame, a handle pivotally secured to the frame at one end thereof, first wheel means rollingly supporting the frame at the handle end thereof, a toggle plate pivotally secured to the frame forwardly of the first wheel means, second wheel means rotatably secured to the toggle plate, link means coupling the handle to the toggle plate to shift the toggle plate in response to pivoting the handle with respect to the frame, stop means engaging the toggle plate when the vertical planes passing through the axial centers of the toggle plate pivot and second wheel axle bear a spaced rela- tionship to each other, all elements being proportioned and oriented to permit retracting the second wheel means by shifting the handle thereby lowering the bed to facilitate loading.

2. A material handling dolly comprising, in combination, a frame having a load bed portion, a handle pivoted to the frame, a first wheel fixed to one end of the frame, a toggle plate pivoted to the other end of the frame at a toggle plate pivot, a second wheel secured to the toggle plate at a wheel center, means connecting the handle and the toggle plate to pivotally raise or lower the wheel in response to pivoting the handle with relation to the frame, and a toggle plate stop oriented to engage the toggle plate when the wheel is lowered and the vertical planes passing through the axial centers of the wheel and toggle plate are in spaced relation, thereby permitting the load on the bed to lock the wheel against retraction.

3. A material handling dolly comprising, in combination, a frame having a load bed portion, a handle pivoted to the frame at one end thereof, a wheel secured to the frame at the handle end thereof, a toggle plate pivoted to the frame at a toggle plate pivot at the other end of the frame, a second wheel secured to the toggle plate at a wheel center, a link connecting the handle and the toggle plate to pivotally raise or lower the second wheel in response to pivoting the handle with relation to the frame, and a toggle plate stop oriented to engage the toggle plate when the wheel is lowered and the vertical planes passing through the axial centers of the wheel and toggle are parallel and spaced, thereby permitting the load on the bed to lock the wheel against retraction.

4. A material handling dolly comprising, in combination, a frame, a bed for the frame open at its forward portion, a handle, handle legs pivotally secured at their lower portions to the rear of the frame, first wheel means fixed to the rear of the frame providing rolling support for the frame and bed, a pair of toggle plates pivotally secured to the frame at the forward portion thereof and flanking the frame, a pair of second wheel means, each wheel having axle means securing the wheel to the toggle plate, a pair of links pivotally connected at one end to a handle leg and at the other end to its respective toggle plate, and a toggle plate stop oriented to stop the rotation of the toggle plate at a point where the vertical planes passing through the toggle plate centers and wheel centers are in spaced relation.

5. A material handling dolly comprising, in combination, a frame, a bed for the frame open at its forward portion, an elongate bed sling having upturned end portions proportioned to underlie the bed with the end portions flanking the bed, a handle, handle legs pivotally secured at their lower portions to the rear of the frame, first wheel means fixed to the rear of the frame providing rolling support for the frame and bed, a pair of toggle plates pivotally secured to the sling end portions, a second wheel means including a pair of wheels, each wheel having axle means securing the wheel to the toggle plate, a pair of links pivotally connected at one end to a handle leg and at the other end to its respective toggle plate, and a toggle plate stop oriented to stop the rotation of the toggle plate at a point where the toggle plate axial centers and wheel axial centers are on spaced vertical planes.

6. A material handling dolly characterized by a frame having a forward work-engaging portion, a combination towing and operating handle pivotally secured to the frame at the end opposite the work-engaging portion, first wheel means rollingly supporting the frame adjacent the handle, a toggle plate, second wheel means rotatably secured to the toggle plate, means pivotally securing the toggle plate to the frame forward of the first wheel means, link means coupling the handle to the toggle plate to shift the toggle plate in response to pivoting the handle with respect to the frame, stop means limiting the second wheel means in the down position, all elements being proportioned and oriented to permit retracting the second wheel means by shifting the handle thereby lowering the frame at the work-engaging portion whereby the frame is inserted beneath a tilted load by pushing the handle, and the work is engaged and transported by pulling the handle.

7. A material handling dolly characterized by a frame having a forward work-engaging portion, a combination towing and operating handle pivotally secured to the frame at the end opposite the work-engaging portion, first wheel means rollingly supporting the frame adjacent the handle, a toggle plate, second wheel means rotatably secured to the toggle plate, means pivotally securing the toggle plate to the frame forward of the first wheel means, link means coupling the handle to the toggle plate to shift the toggle plate in response to pivoting the handle with respect to the frame, stop means for engaging the toggle plate and limiting the toggle plate to predetermined end positions during pivoting thereof while lifting and towing, all elements being proportioned to define a means for lowering and raising the work-engaging portion by pivoting it about the first wheel means through pivoting of the toggle plate and second wheel means between the end positions defined by said stop means responsive to movement of the handle out of and into, respectively, towing position.

References Cited in the file of this patent
UNITED STATES PATENTS

| | | |
|---|---|---|
| 1,241,366 | Forney | Sept. 25, 1917 |
| 1,554,903 | Beatty | Sept. 22, 1925 |
| 1,956,245 | Moorman et al. | Apr. 24, 1934 |
| 2,325,396 | Hastings et al. | Sept. 27, 1943 |
| 2,491,953 | Coats | Dec. 20, 1949 |
| 2,727,752 | Gold | Dec. 20, 1955 |
| 2,784,857 | Duffy | Mar. 12, 1957 |
| 2,822,944 | Blomgren | Feb. 11, 1958 |